United States Patent [19]

Stubbersfield

[11] Patent Number: 4,701,061
[45] Date of Patent: Oct. 20, 1987

[54] BRAKE SHAFT BEARINGS

[75] Inventor: Edgar M. Stubbersfield, Gatton, Australia

[73] Assignee: Beryl Grace Stubbersfield, Gatton, Australia; a part interest

[21] Appl. No.: 909,935

[22] Filed: Sep. 22, 1986

[51] Int. Cl.$^4$ ............................................. F16C 33/58
[52] U.S. Cl. .................................... 384/484; 384/560; 384/564; 384/569
[58] Field of Search ............... 384/484, 564, 569, 486, 384/560, 903

[56] References Cited

U.S. PATENT DOCUMENTS 2,830,832  4/1958  Moorman et al. .................. 384/484
3,532,400  10/1970  Benson et al. ..................... 384/484

FOREIGN PATENT DOCUMENTS 1193598  6/1970  United Kingdom .
1219083  1/1971  United Kingdom .
1274406  5/1972  United Kingdom .
1278760  6/1972  United Kingdom .

Primary Examiner—Lenard A. Footland
Attorney, Agent, or Firm—Kimmel, Crowell & Weaver

[57] ABSTRACT

A brake shaft bearing assembly for an "S" cam type brake shaft has pairs of needle rollers which bear on the brake shaft and which run in outer races fitted in a bearing housing on a vehicle. Each outer race is of stepped configuration to provide an abutment face locating it in the housing and is fitted with a dust seal assembly at its outer end. The bearing assembly is retained in the housing by a circlip fitted to the brake shaft.

3 Claims, 1 Drawing Figure

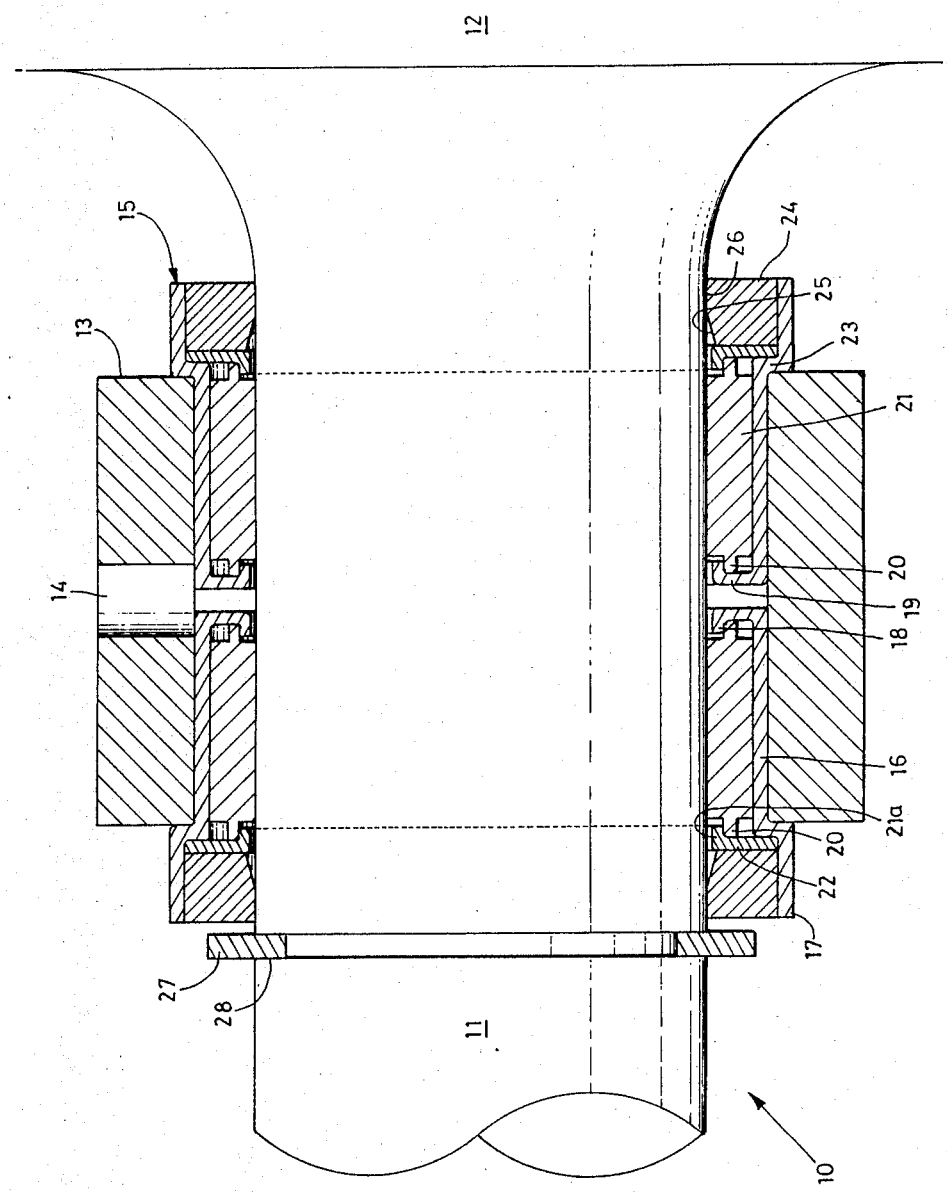

BRAKE SHAFT BEARINGS

BACKGROUND OF THE INVENTION (1) Field of the Invention

This invention relates to brake shaft bearings.

(2) Prior Art

Semi-trailers and large truck brakes are operated by an "S" cam which is activated by an air cylinder, each cam shaft being supported at its ends by nylon bushes. While the bush at the activating end of the cam shaft can be easily replaced, the bush behind the "S" cam itself can only be replaced by removing the wheels from the axle. On a triaxle trailer, where there are six sets of wheels to be removed, this is not a simple task.

Where the trailers operate off highway, the life of the nylon shaft bushes is drastically reduced as they cannot be lubricated otherwise dust combines with the grease to form an effecting grinding paste. The bushes may wear out as frequently as every three months and must be replaced. As the bushes wear, the cams drop relative to the brake backing plate, causing the bottom brake shoe to rub and wear. Therefore the brake linings have to be replaced more frequently than should be necessary, and wear also occurs on the cam shafts and the bush housing.

SUMMARY OF THE PRESENT INVENTION

It is an object of the present invention to provide a bearing assembly for the cam shafts which have reduced wear.

It is a preferred object to provide a seal assembly which enables the bearings to be greased for longer life.

It is a further preferred object to provide a bearing assembly which can be easily replaced when required and which can be fitted to a standard bush housing during ordinary servicing or as original equipment.

Other preferred objects of the present invention will become apparent from the following description.

In one aspect the present invention resides in a bearing and seal assembly for rotatably supporting a brake shaft in a bearing or bush housing on a vehicle axle, the assembly including:

a pair of outer bearing races to be inserted into the housing from each side;

a plurality of needle rollers rotatably supported in the outer bearing races adapted to bear against and support the cam shaft;

a respective dust seal housing attached to each outer bearing race of greater diameter than the outer bearing race and connected to the outer bearing race by an annular web engageable with a respective outer face of the bush housing; and a dust seal in each seal housing having at least one lip engageable with the cam shaft so arranged that when grease is pumped into the bush housing to lubricate the needle rollers, excess grease can escape under the lip or lips of the seal but dust is prevented from entering the bush housing.

Preferably the bearing and seal assembly is retained in the bush housing by a circlip engaged in a circumferential groove in the brake cam shaft.

Preferably the bearing and seal assembly is provided for each cam end of each brake shaft. However, the assembly can also be provided for the activating end of the brake cam shaft.

In a second aspect, the present invention resides in a brake cam shaft bearing including:

an outer bearing race to be inserted in a bearing or bush housing;

a plurality of needle rollers rotatably supported in the outer bearing race to bear against and support the cam shaft;

a seal housing at one end of the outer bearing race and of greater diameter than the outer bearing race;

seal means in the seal housing, the seal means having at least one lip engageable with the cam shaft to enable excess grease in the bush housing to escape under the lip or lips but to prevent dust entering the bush housing; and an annular web interconnecting the seal housing and the outer bearing race engageable with an end face of the bush housing to locate the outer bearing race in the bush housing.

It will be readily apparent to the skilled addressee that the needle roller in the bearings can be replaced e.g. by tapered rollers, balls or the like.

BRIEF DESCRIPTION OF THE DRAWING

To enable the invention to be fully understood, a preferred embodiment will now be described with reference to the accompanying drawing, which is a sectional side view showing the bearing and seal assembly supporting a brake cam shaft in a conventional bush housing fitted to a vehicle axle.

DETAILED DESCRIPTION OF THE PREFERRED EMBODIMENT

The cam shaft 10 is of conventional type with a cylindrical shaft body 11 having an "S" cam 12 which engages the brake shoe rollers (not shown). The bush housing 13 is provided on the standard anchor bracket (not shown) mounted at one end of the axle assembly.

A small hole 14 is provided in the housing 13 to receive a grease nipple (not shown) which engages grease to be pumped into the interior of the housing when fitted with the bearing and seal assembly 15 of the present invention.

Each bearing has an outer race 16 inserted into the housing 13 with an outer enlarged dust seal housing 17 which forms an abutment to engage the adjacent outer face of the bush housing 13. The inner end of each race 16 is provided with an inturned flange 18, supported by an annular web 19, to support the stub axles 20 at the inner ends of the needle rollers. A similar inturned flange 21a is supported on an annular web 22 to support the stub axles 20 at the outer ends of the needle rollers. As shown, the annular web 22 is fixed to the annular web 23 interconnecting the outer race 16 and the dust seal housing 17, that annular web 23 abutting the bush housing 13.

A dust seal 24 of resilient elastomeric material, is fitted in each dust seal housing 17 and has an outwardly tapered inner face 25 with a lip 26 which bears and seals against the cylindrical shaft body 11.

A circlip 27, received in a circumferential groove 28 in the shaft body 11, retains the bearing and seal assembly 15 in the bush housing 13.

In use, the cam shaft 10 and conventional nylon bushes are removed.

The hole 14 is drilled in the bush housing and fitted with a grease nipple as hereinbefore described. Each bearing and seal is then inserted into the housing from a respective end, with the annular webs 23 abutting the adjacent outer faces of the bush housing 13.

The cam shaft is refitted and the circlip 27 is installed to retain the bearing and seal assembly 15 in the housing 13.

Grease is pumped into the housing to lubricate the needle rollers 21. Excess grease escapes under the lips 26 of the seals 24 to displace any dust adjacent the seals. The lips 26 on the seals 24 re-engage the cam shaft body 11 to prevent the ingress of dust into the bearing and seal assembly 15.

In a modified form of the invention, the seal 15 may be replaced with a double-lip seal to provide improved sealing engagement between the seal and the brake cam shaft.

With regular greasing to lubricate the needle rollers, the bearing and seal assembly should last many times the life of the conventional nylon bushes, especially in off-highway operation of the trailers.

The present invention provides a simple, yet highly effective replacement assembly for the existing nylon bushes.

Various changes and modifications may be made to the embodiment described without departing from the scope of the present invention defined in the appended claims.

I claim:

1. A bearing and seal assembly for rotatably supporting a brake shaft in a bearing or bush housing on a vehicle axle, the assembly including:
   a pair of outer bearing races to be inserted into the housing from each side;
   a plurality of needle rollers rotatably supported in the outer bearing races adapted to bear against and support the cam shaft;
   a respective dust seal housing attached to each outer bearing race of greater diameter than the outer bearing race and connected to the outer bearing race by an annular web engageable with a respective outer face of the bush housing;
   a dust seal in each seal housing having at least one lip engageable with the cam shaft so arranged that when grease is pumped into the bush housing to lubricate the needle rollers, excess grease can escape under the lip or lips of the seal but dust is prevented from entering the bush housing; and
   the assembly being retained in the bush housing by a circlip engaged in a circumferential groove in the brake cam shaft.

2. The assembly as claimed in claim 1 wherein:
   the ends of each outer bearing race have inturned flanges, supported by annular webs, to support stub axles on the ends of the needle rollers.

3. A bearing and seal assembly for rotatably supporting a brake shaft in a bearing or bush housing on a vehicle axle, the assembly including:
   a pair of outer bearing races to be inserted into the housing from each side;
   a plurality of needle rollers rotatably supported in the outer bearing races adapted to bear against and support the cam shaft;
   a respective dust seal housing attached to each outer bearing race of greater diameter than the outer bearing race and connected to the outer bearing race by an annular web engageable with a respective outer face of the bush housing;
   a dust seal in each seal housing having at least one lip engageable with the cam shaft so arranged that when grease is pumped into the bush housing to lubricate the needle rollers, excess grease can escape under the lip or lips of the seal but dust is prevented from entering the bush housing; and
   the ends of each outer bearing race having inturned flanges, supported by annular webs, to support stub axles on the ends of the needle rollers.

* * * * *